United States Patent
Kobayashi et al.

(10) Patent No.: US 6,770,692 B1
(45) Date of Patent: Aug. 3, 2004

(54) PLASTIC BASE MATERIAL

(75) Inventors: Tadashi Kobayashi, Fukui (JP);
Kazuhiko Tsujibata, Fukui (JP)

(73) Assignee: Asahi Lite Optical Co., Ltd., Fukui (JP)

( * ) Notice: Subject to any disclaimer, the term of this patent is extended or adjusted under 35 U.S.C. 154(b) by 206 days.

(21) Appl. No.: 10/129,402

(22) PCT Filed: Nov. 6, 2000

(86) PCT No.: PCT/JP00/07765

§ 371 (c)(1),
(2), (4) Date: Jun. 11, 2002

(87) PCT Pub. No.: WO01/34707

PCT Pub. Date: May 17, 2001

(30) Foreign Application Priority Data

Nov. 5, 1999 (JP) ............................................ 11-315228

(51) Int. Cl.[7] ......................... C08K 5/18; C08K 5/3475
(52) U.S. Cl. ........................ 524/91; 524/242; 523/106
(58) Field of Search ........................... 523/106; 524/91, 524/242

(56) References Cited

U.S. PATENT DOCUMENTS 6,187,844 B1 * 2/2001 Murata ......................... 524/91
6,528,564 B1 * 3/2003 Xia .............................. 524/242

FOREIGN PATENT DOCUMENTS

| EP | 786675 | 7/1997 |
| JP | 8-127661 | 5/1996 |
| JP | 8-183903 | 7/1996 |
| JP | 11-189729 | 7/1999 |

* cited by examiner

Primary Examiner—Kriellion A. Sanders
(74) Attorney, Agent, or Firm—Jordan and Hamburg LLP

(57) ABSTRACT

The present invention provides, by adding an ultraviolet absorbent and a colorant having a specific chemical structure, a plastic base material capable of effectively suppressing the transmission of ultraviolet radiation and short wavelength visible radiation known harmful to eyes, which material further reduces glares.

2 Claims, No Drawings

PLASTIC BASE MATERIAL

TECHNICAL FIELD

The present invention relates to a plastic base material that cuts off ultraviolet and short wavelength optical radiations harmful to eyes.

BACKGROUND ART

As compared with glass, transparent plastic base materials are characterized in that they are lightweight, unbreakable, and in that they are easily dyed or colored. As such transparent plastic base materials, styrene resins, acrylic resins, polycarbonate resins, and ADC resins are commercially available; further nowadays, sulfur-containing urethane resins, sulfur-containing episulfide resins and the like are also utilized, and those having refractive indices exceeding 1.60 are put into market to be used in eyeglasses, optical articles, light-intake windows, and the like.

On the other hand, sunlight contains, in addition to visible radiation, ultraviolet radiation harmful to cornea, crystal lens, retina, etc., of the eyeballs. Ultraviolet radiation is classified into UV-C, UV-B, and UV-A (near ultraviolet radiation), and each has unfavorable influences on the eyeballs.

In case of eyeglasses, for instance, there have been proposed, or put into market, optical lenses that not only correct the abnormal refraction of the wearer, but also are imparted with a function of absorbing ultraviolet radiation to some extent, such that they may protect the eyeballs of the wearer from such harmful ultraviolet radiation.

However, conventionally used in practice were optical lenses designed so as to cut off ultraviolet radiation of 380 nm or shorter in wavelength, because ultraviolet radiation of 380 nm or shorter in wavelength were believed harmful. With progress in the research on the damage of eyeballs, however, it is demanded to cut off ultraviolet radiation of 400 nm or shorter in wavelength. Further recently, not only the ultraviolet radiation of 400 nm or shorter in wavelength, but also blue color radiation of 400 nm or longer in wavelength are being considered problematic, because it has the possibility of causing damages such as macular degeneration with aging. Moreover, glaring can be suppressed by controlling blue color radiation 400 nm or longer in wavelength.

Conventionally, special lenses generally denoted as "UV400 processed", which cuts off ultraviolet radiation, have been supplied in the eyeglass optical lens industry. This type of lens is imparted with an ultraviolet absorbing function, and it utilizes a lens base material colored with an ultraviolet-absorbing compound available as a ultraviolet absorbent by means of immersion coloring or the like. However, the lens produced by the method above has disadvantages, such that the lens undergo extreme yellow coloring with passage of time; in extreme cases, it was found that the feeling on wearing becomes extremely impaired due to yellow coloring of the lens which occurs in about a month after starting wearing.

In the light of the aforementioned circumstances, there are proposed lenses which effectively suppress the transmission of ultraviolet radiation of 400 nm or shorter in wavelength, and which are also free from yellow coloring with passage of time. There are proposed, for instance, a lens such as that comprising a base material and/or a hard coating layer containing mixed therein an ultraviolet absorbent or that using titanium dioxide having a ultraviolet absorbing function, and comprising an antireflection layer having, as the constituent layer thereof, a titanium dioxide layer having a thickness capable of efficiently suppressing the transmission of ultraviolet radiation.

For instance, the lens proposed in Japanese Patent Laid-Open No. 51706/1985 effectively suppresses the transmission of ultraviolet radiation of 380 nm or shorter in wavelength, however, suppressing ultraviolet radiation of 380 to 400 nm in wavelength is still insufficient.

In Japanese Patent Laid-Open No. 265059/1997 is proposed an optical lens for eyeglasses capable of cutting off ultraviolet radiation up to 400 nm in wavelength, having a base material and/or a hard coating layer containing an ultraviolet absorbent, with a multi-layered antireflection film containing a titanium dioxide layer provided thereon at a predetermined thickness or thicker. Further, in Japanese Patent Laid-Open No. 186291/1998 is disclosed a plastic lens containing an ultraviolet absorbent having an average light transmittance of 0.5% or lower for radiation in the wavelength region of 300 nm or longer but not longer than 400 nm. Furthermore, in Japanese Patent Laid-Open No. 218602/1999 is disclosed a plastic lens containing at least two types of ultraviolet absorbents differing in maximum absorption wavelength.

The lenses proposed above are effective for controlling the ultraviolet radiation of 400 nm or shorter in wavelength since the development was done mainly on the control of the radiation of the wavelength; however, the control of blue color radiation in the visible region remains still insufficient.

Further, if ultraviolet absorbents should be added in large quantities, it is certainly possible to suppress the transmission of radiation in the blue color region; however, the resulting lens becomes yellow-colored to impair the product value. Moreover, the addition of the agents in large quantities may cause unfavorable results, such as fogging of the plastic base lens material, inferior heat-resistance due to the drop in softening point of the resin, etc.

On the other hand, in Japanese Patent Laid-Open No. 133801/1997 is described a method comprising mixing a trace amount of blue-colored colorant with an aim to obtain a colorless and transparent lens by suppressing the yellow coloring which occurs with heat treatment and the like of lens base material such as a urethane resin lens. However, in case blue-color colorant is applied to a lens base material containing an ultraviolet absorbent in large quantities, the lens results in a green colored material to make it difficult to obtain the transparent appearance. Furthermore, although lenses colored to blue to an excessive extent to stress transparency are partly put into market, there is another disadvantage that, in colored lenses which are the characteristic products for plastic lenses, the desired color cannot be obtained and result in an unclear color hue.

An object of the present invention is to provide a plastic base material, which suppresses the transmission of not only the ultraviolet radiation of 400 nm or shorter in wavelength, but also the blue color radiation of 400 to 420 nm in wavelength, harmful to eyeballs, while preventing glaring and yet providing a transparent appearance. In further detail, the object is to provide a plastic base material having a transmittance of 10% or lower for radiation of 400 nm in wavelength and a transmittance in a range of from 40 to 60% for radiation of 410 nm in wavelength, i.e., an average transmittance of about 50% in a wavelength range of from 400 to 420 nm, and yet having a transparent appearance. The plastic base material according to the present invention can be applied not only to eyeglasses, but also to construction materials such as light-intake windows and the like, which will protect the inhabitants living indoors from harmful rays.

DISCLOSURE OF THE INVENTION

The inventors have conducted extensive studies on the control of visible radiation of 420 nm or shorter in wavelength and ultraviolet radiation, as well as on the prevention of glaring. As a result, it has been found that a base material in compliance with the object above can be obtained by mixing an ultraviolet absorbent and a colorant each having a specific chemical structure into the plastic base material. The present invention has been accomplished based on those findings.

The present invention provides a plastic base material characterized by that it contains a benzotriazole based ultraviolet absorbent expressed by the general formula (1) and an anthraquinone based violet colorant expressed by the general formula (2), and that it yields a transmittance of 1% or lower for a radiation of 390 nm in wavelength and a transmittance of 10% or lower for a radiation of 400 nm in wavelength. Furthermore, glaring can be efficiently suppressed by reducing the transmittance of radiation of 410 nm in wavelength to a range of from 40 to 60%. If the transmittance at a wavelength of 410 nm should be lowered too excessively, the transmittance in the wavelength region of from 440 to 450 nm may be also influenced to impair the color sensation. On the other hand, if the transmittance above should be set too high, glaring cannot be effectively prevented from occurring.

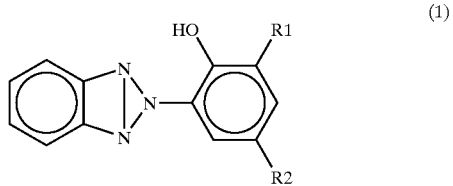
(1)

wherein, R1 and R2 each represent a C1 to C8 alkyl group, which may be the same or different,

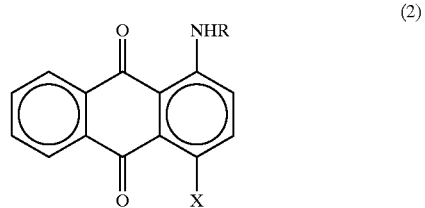
(2)

wherein, R represents a substituted or an unsubstituted phenyl group, and X represents —OH or —NHR.

BEST MODE FOR CARRYING OUT THE INVENTION

In the present invention, there is no particular limitation on the usable plastic base materials, but favorably applied are thermosetting resins such as CR-39, thiourethane resins, sulfur-containing episulfide resins, etc., and thermoplastic resins such as styrene resins, acrylic resins, polycarbonate resins, cyclic olefin resins, norbornene resins, etc.

For instance, nowadays, thiourethane resin is often used as a high-refraction material for the eyeglass lens substrate, and it is generally obtained by heat polymerization of a polyisocyanate compound having two or more functional groups with a polythiol compound having three or more functional groups under the presence of a catalyst.

There can be used any type of polyisocyanate selected from aliphatic, aromatic, and alicyclic polyisocyanates without limitations; however, preferably used are the aromatic or alicyclic diisocyanates. More specifically, mentioned are m-xylylenediisocyanate, trilenediisocyanate, 4,4'-diphenylmethanediisocyanate, tetramethyl-m-xylylenediisocyanate, isophoronediisocyanate, bis(isocyanatomethyl)cyclohexane, dicyclohexylmethanediisocyanate, cyclohexanediisocyanate, 2,5-bis(isocyanatomethyl)bicyclo [2,2,1]-heptane, 2,6-bis(isocyanatomethyl)bicyclo[2,2,1]-heptane, etc.

As polythiol, generally used are trithiol or tetrathiol, and favorably used are pentaerythritol tetrakisthioglycolate, pentaerythritol tetrakis(3-mercaptopropionate), 1,2-bis[(2-mercaptoethyl)thio]-3-mercaptopropane, 4-mercaptomethyl-3,6-dithia-1,8-octanedithiol, etc.

Sulfur-containing episulfide resins can be obtained by polymerizing and curing the compounds proposed in, for instance, Japanese Patent Laid-Open No. 71580/1997, Japanese Patent Laid-Open No. 110979/1997, Japanese Patent Laid-Open No. 183702/1999, and the like.

Concerning construction materials, polycarbonate resins, acrylic resins, etc., are used nowadays in the place of glass from the viewpoint of safety, and the plastic base material obtainable by processing these materials according to the present invention can further protect the inhabitants from harmful rays. In case of thermoplastic resins, ultraviolet absorbents and colorants may be added on polymerization, or may be mixed under heating and melting the resin obtained by polymerization. In general, the latter method is employed.

In order to improve the physical properties and the like of the resulting product, there can be added in producing the resins above, as a resin improving agent, for instance, a lubricant, an antioxidant, a fragrant, a perfume, or a copolymerizable compound and the like.

The ultraviolet absorbent for use in the plastic base material according to the present invention is a compound expressed by the general formula (1), and the plastic base material having the targeted performance can be obtained by adding the ultraviolet absorbent in a quantity of from 0.1 to 1.0% by weight with respect to the resin. The amount of addition should be determined in accordance with the resulting spectral transmittance. Although it differs depending on the type of the resin, in case of a compound other than that expressed by the general formula (1), for instance, an addition of 1.5% by weight or more is necessary to obtain the aimed ultraviolet absorbing function; yet, such an addition still fails to efficiently suppress the transmission of visible radiation in the wavelength range of from 400 to 420 nm, and lowers the softening point of the resin due to excessive amount of addition, thereby causing thermal deformation on processing the lens for forming hard coating or antireflection coating. In case of another compound, an addition of 0.2 to 0.4% by weight is effective for cutting off radiation in the wavelength region of 400 nm or shorter. However, it brings about a drop in transmittance for radiation in the wavelength range of about 400 to 440 nm, and results in a yellow-colored product.

As the ultraviolet absorbent expressed by the general formula (1), there can be used, for instance, 2-(3,5-ditertiary-butyl-2-hydroxyphenyl)-2H-benzotriazole, 2-(3, 5-ditertiary-pentyl-2-hydroxyphenyl)-2H-benzotriazole, 2-(3,5-bis(α,α-dimethylbenzyl)-2-hydroxyphenyl)-2H-benzotriazole, etc.

The colorants for use in the plastic base material according to the present invention is a violet colorant expressed by the general formula (2), and it provides a color hue with transparent appearance when used in combination with the ultraviolet absorbent according to the present invention. If a blue-color dye should be used, a greenish color hue results, and a transparent appearance becomes unfeasible. As the violet colorant, for instance, a solvent violet type colorant described in Color Index (or C.I.) can be selected, and although depending on the type of colorant used, the amount of addition is preferably in a range of from 0.1 to 1.0 ppm with respect to the resin. If the addition should be too low, transparent appearance is unfeasible as the product results yellowish. If the addition should be too high, the product results violet colored, and there are disadvantages as such that not only the transparent appearance becomes unfeasible, but also the desired color hue would not be obtained after post treatment such as coloring process, resulting in a product having an obscure color hue.

In the present invention, for instance, in case of producing eyeglasses using thiourethane resin, for example, an ultraviolet absorbent, a colorant, a catalyst, and a polythiol compound are added into a polyisocyanate compound, and the raw material mixture obtained by stirring and degassing is injected into a constituent body comprised of two pieces of glass or metal molds aligned previously with gaskets or tapes incorporated between them (which are referred to hereinafter as "shells"). A lens material made of solid thiourethane based material can be obtained by heating and polymerizing the raw material mixture under predetermined conditions of temperature and time.

The lens base material thus obtained is provided for practical use in eyeglasses; hence, if necessary, the surface of the material is then subjected to hard-coat coating for preventing scratches from forming, to the formation of antireflection coating by using a multi-layered film of metal inorganic compounds, or to waterproof coating and the like.

On forming a film of hard-coating, an arbitrary known hard-coating composition is coated by employing immersion method, spin coating method, etc. and after that, dried. For instance, there may be used a hard-coating composition containing, as the main components thereof, an organic silicone based compound, fine particles of metal oxides such as silicon dioxide, titanium dioxide, etc., and a curing agent. If necessary, the hard-coating composition may further contain various types of additives blended therein, such as a solvent, an antioxidant, a light and/or heat resistant stabilizer, an ultraviolet absorbent, an oil-soluble dye, a dispersion dye, a pigment, a phosphorescent whitening agent, a photochromic compound, a leveling agent, a dispersion stabilizer, a defoaming agent, a thickener, an antistatic agent, an anti-fogging agent, etc.

On coating the coating composition, to improve the adhesiveness of the coating with the lens base material, it is effective to perform a pretreatment on the surface of the base material, such as an alkali treatment, an acid treatment, a surfactant treatment, a polish treatment using fine particles, a plasma treatment, a treatment using active energy radiation such as an ultraviolet radiation, etc. For the same purpose, it is also effective to apply a primer coating treatment.

Then, an antireflection coating film made of inorganic substance is formed on the surface of the hard-coating film thus obtained. As a method for forming the films, there can be mentioned, for instance, vacuum evaporation, ion plating, sputtering, etc. In performing vacuum evaporation, an ion beam assist method, which comprises irradiating an ion beam simultaneously with evaporation, may be employed. The film constitution may be either mono-layered or multi-layered, and is properly selected depending on the desired antireflection properties. As examples of the usable preferred inorganic materials, there can be mentioned silicon oxide ($SiO_2$, $SiO$, etc.), titanium oxide ($TiO_2$, $TiO$, $Ti_2O_3$, $Ti_2O_5$, etc.), zirconium oxide, aluminum oxide, tantalum oxide, cerium oxide, magnesium oxide, yttrium oxide, tin oxide, magnesium fluoride, tungsten oxide, etc.

The present invention is described in further detail by making reference to examples and comparative examples, however, the present invention is not limited thereto. The performance of the lens obtained in accordance with the production method according to the present invention was tested on items as follows.

1. Transmittance and YI value: Measurement was performed on a lens having a center thickness of 1.05 mm and a refractive power of -4.00 D by using model "DOT-3" manufactured by Murakami Shikisai Kenkyusho.

EXAMPLE 1

In 52 kg of m-xylylenediisocyanate were added 400 g of 2-(3,5-ditertiary-pentyl-2-hydroxyphenyl)-2H-benzotriazole (SEESORB 704, manufactured by Shipro Kasei) (accounting for 0.4% by weight with respect to the total amount of resin) as the ultraviolet absorbent, 60 mg of Solvent Violet 13 (accounting for 0.6 ppm with respect to the resin) as the violet colorant, 48 kg of 4-mercaptomethyl-3,6-dithia-1,8-octandithiol, and 200 ppm of dibutyltin dichloride as the catalyst. The resulting mixture was stirred while cooling to 15° C., and was degassed under a reduced pressure of 3 mmHg to obtain a monomer solution. After injecting the thus prepared monomer solution into a shell previously provided with tapes incorporated between the two pieces of glass molds aligned therein, the solution in the shell was heated to 110° C. over 5 hours in a heating oven. On finishing polymerization, the shell was disintegrated to obtain a cured lens. The spectral transmittance of the thus obtained lens was measured. The measured transmittance at each wavelength is given in Table 1. The color hue of the thus obtained lens was slightly bluish and transparent, and the YI value was 1.8.

EXAMPLE 2

A lens was obtained in the same manner as that described in Example 1, except for using 500 g of 2-(3,5-ditertiary-butyl-2-hydroxyphenyl)-2H-benzotriazole (TINUVIN 320, manufactured by Ciba Geigy) as the ultraviolet absorbent and 0.5 ppm of O-plus Violet 732 (manufactured by Orient Chemical Industries) as the colorant. The color hue of the obtained lens was approximately colorless and transparent, and a YI value was 2.0.

EXAMPLE 3

In 43.5 kg of m-xylylenediisocyanate were added 500 g of 2-(3,5-ditertiary-pentyl-2-hydroxyphenyl)-2H-benzotriazole (SEESORB 704, manufactured by Shipro Kasei) (accounting for 0.5% by weight with respect to the total amount of resin) as the ultraviolet absorbent, 50 mg of Solvent Violet 13 (accounting for 0.5 ppm with respect to the resin) as the violet colorant, 56.5 kg of pentaerythritol tetrakis(3-mercaptopropionate), and 200 ppm of dibutyltin dichloride as the catalyst. The resulting mixture was stirred while cooling to 15° C., and was degassed under a reduced pressure of 3 mmHg to obtain a monomer solution. The prepared monomer solution was injected into a previously prepared shell, followed by heating to 110° C. over 5 hours in a heating oven to conduct polymerization and curing. On finishing polymerization, the shell was disintegrated to obtain a cured lens. The color hue of the obtained lens was approximately colorless and transparent.

COMPARATIVE EXAMPLE 1

A lens was produced in the same manner as that described in Example 1, except for using 0.1% of 2-(3-tertiarybutyl-5-methyl-2-hydroxyphenyl)-5-chlorobenzotriazole (TINUVIN 326, manufactured by Ciba Geigy) as the ultraviolet absorbent with no addition of the colorant. The obtained lens was colored yellow, having a YI value of 4.2.

COMPARATIVE EXAMPLE 2

A lens was obtained in the same manner as that described in Comparative Example 1, except for adding 1.0 ppm of a blue colorant (diaminoanthraquinone based). The obtained lens was colored yellow-green, having a YI value of 3.9.

COMPARATIVE EXAMPLE 3

A lens was obtained in the same manner as that described in Comparative Example 2 by using the same raw material as that in Example 1, except for using 2% of 2-(5-methyl-2-hydroxyphenyl) benzotriazole (TINUVIN P, manufactured by Ciba Geigy) as the ultraviolet absorbent. The obtained lens was colored pale yellow, having a YI value of 3.2.

COMPARATIVE EXAMPLE 4

A lens was obtained in the same manner as that described in Comparative Example 2 by using the same raw material as that in Example 1, except for using 1.8% of 2-(S-tertiaryoctyl-2-hydroxyphenyl) benzotriazole (TINUVIN 329, manufactured by Ciba Geigy) as the ultraviolet absorbent. The lens thus obtained was blue-colored, and the transmittances for radiation of 410 and 420 nm in wavelength were high.

TABLE 1

| | Optical transmittance at each wavelength | | | |
|---|---|---|---|---|
| | 390 nm | 400 nm | 410 nm | 420 nm |
| Example 1 | 0.4% | 11% | 58% | 87% |
| Example 2 | 0.4% | 5% | 50% | 83% |
| Example 3 | 0.4% | 8% | 52% | 84% |
| Comparative Example 1 | 0.4% | 3% | 42% | 79% |
| Comparative Example 2 | 0.4% | 3% | 42% | 79% |
| Comparative Example 3 | 0.4% | 9% | 67% | 89% |
| Comparative Example 4 | 0.4% | 8% | 66% | 91% |

Industrial Applicability

As described above, the plastic base materials produced in accordance with the present invention have remarkable effects, since it is highly contributive for the eyeglass industry and eyeglass wearers by providing improved performance on eyeglasses and high cost performance, and it generates comfortable inhabitancy capable of protecting the inhabitants from harmful rays when used as a building material.

What is claimed is:

1. A plastic composition comprising
   a plastic base material,
   0.1 to 1.0% by weight of a benzotriazole based ultraviolet absorbent expressed by the following general formula (1)

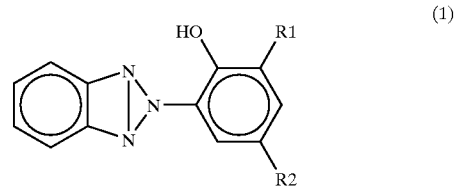

wherein, R1 and R2 each represent a C1 to C8 alkyl group, which may be the same or different,
   and 0.1 to 1.0 ppm by weight of an anthraquinone based violet colorant expressed by the following general formula (2)

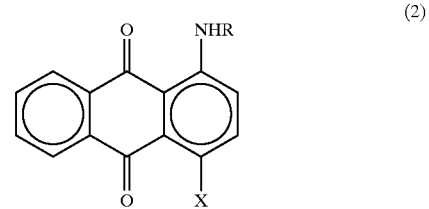

wherein, R represents a substituted or an unsubstituted phenyl group, and X represents —OH or —NHR,
   the composition having a transmittance for a radiation of 390 nm in wavelength of 1% or lower, a transmittance for a radiation of 400 nm in wavelength of 10% or lower, and a transmittance for radiation of 410 nm in wavelength in a range of from 40 to 60%.

2. A plastic lens comprised of the composition of claim 1, the plastic lens having a transmittance for a radiation of 390 nm in wavelength of 1% or lower, a transmittance for a radiation of 400 nm in wavelength of 10% or lower, and a transmittance for radiation of 410 nm in wavelength in a range of from 40 to 60%.

* * * * *